United States Patent
Adams et al.

(10) Patent No.: US 6,889,347 B1
(45) Date of Patent: May 3, 2005

(54) AUTOMATIC CONFIGURATION AND OPTIMIZATION OF OPTICAL TRANSMISSION USING RAW ERROR RATE MONITORING

(75) Inventors: Laura Ellen Adams, San Jose, CA (US); John Paul Mattia, San Jose, CA (US); Jonathan P. King, San Jose, CA (US)

(73) Assignee: Big Bear Networks, Inc., Milpitas, CA (US)

( * ) Notice: Subject to any disclaimer, the term of this patent is extended or adjusted under 35 U.S.C. 154(b) by 591 days.

(21) Appl. No.: 09/881,951

(22) Filed: Jun. 15, 2001

(51) Int. Cl.[7] .......................... G01F 11/00; H04B 10/00; H04J 14/02
(52) U.S. Cl. .......................... 714/704; 398/81; 398/147
(58) Field of Search .................. 714/704, 706, 714/705, 48; 389/81, 147

(56) References Cited

U.S. PATENT DOCUMENTS

| | | | | |
|---|---|---|---|---|
| 5,969,840 A | * | 10/1999 | Roberts | 398/32 |
| 6,433,904 B1 | * | 8/2002 | Swanson et al. | 398/91 |
| 6,434,286 B2 | * | 8/2002 | Hayashi et al. | 385/15 |
| 6,526,532 B1 | * | 2/2003 | Cinkler et al. | 714/712 |
| 6,580,531 B1 | * | 6/2003 | Swanson et al. | 398/5 |
| 6,662,317 B2 | * | 12/2003 | Tomofuji | 714/48 |

* cited by examiner

Primary Examiner—Albert Decady
Assistant Examiner—Esaw Abraham

(57) ABSTRACT

The system includes a receiver for receiving a bit stream; an error monitor for indicating a first error rate for a first set of data received in the bit stream; and an adjustable circuit for converting an incoming signal into the bit stream using a reference signal that is modulated using a control signal. The system also includes a subsystem for correlating the first error rate and the control signal to generate the reference signal. The control signal has an amplitude that is selected so that a second set of data received in the bit stream has a second error rate that is less than the first error rate.

35 Claims, 3 Drawing Sheets

AUTOMATIC CONFIGURATION AND OPTIMIZATION OF OPTICAL TRANSMISSION USING RAW ERROR RATE MONITORING

FIELD OF INVENTION

This invention pertains to the field of digital optical communications, in particular, to the configuration and optimization of optical and electrical components of an optical transmission system.

BACKGROUND

A typical digital optical communications system includes a transmitter, an optical channel (e.g., optical fibre), and a receiver. Light, generated and modulated by the transmitter, travels through the optical channel and is detected by the receiver. The receiver demodulates the received light to recover the original transmitted data signal.

The quality of a data transmission system is expressed as a ratio of the number of incorrectly received bits to the number of corrected received bits, also known as the bit error rate (BER). Modern data transmission systems typically require a BER of less than $10^{-12}$ to be considered commercially viable.

Optical transmission systems are inherently lossy. Physical phenomena degrade the transmitted signal, limiting its integrity at the receiver, causing the incorrect detection of one or more bits. Some of these phenomena are statistical in nature, while others are bulk effects. Generally, the higher the data transmission rate, the higher the BER—other factors being held constant. Many techniques of improving the BER while increasing the data rate are known.

One well-known technique is forward error correction (FEC). One example of an FEC coding scheme used 'block codes'. This technique operates by dividing the transmitted data into blocks. Additional bits, known as check bits, are generated by processing the bits of the block and added to the block before transmission. The receiver detects the bits of the augmented block, processing the received original data bits to generate a local version of the check bits. Differences in the generated and received check bits indicate and permit correction of errors in the transmitted data. As the ratio of check bits to original data bits increases, the ability of the system to detect and correct single- and multiple-bit errors increases, decreasing the overall system BER. Check bit generation schemes are well known in the art, examples of some techniques can be found in 'A common sense approach to the theory of error correction codes', by Benjamin Arazi (ISBN 0-262-01098-4), incorporated herein by reference.

Systems with FEC are said to have two bit error rates. The first is the error rate of the data transmission system before the corrective effects of FEC, which is known as the raw bit error rate (raw BER). The second is the error rate of the data transmission system after the corrective effects of FEC, which is known as the system bit error rate (system BER) or, sometimes, simply as the bit error rate (BER). The difference between the raw BER and the system BER is determined by the effectiveness of the actual error correction code. Commonly used FEC coding techniques provide approximately a $10^8$ reduction in BER with approximately a 7% increase in transmitted data rate requirements. In a typical system, this translates into the tolerance of up to a $10^{-4}$ raw BER for the physical transmission system while the system BER is still below the $10^{-12}$ market requirement.

Phenomenon in an optical transmission system occur that degrade the quality of the transmitted signal, reducing the signal to noise ratio (SNR) at the receiver and leading to an increase in the BER. Techniques have been developed to compensate for these effects including: chromatic dispersion compensation, polarization mode dispersion compensation, optical filtering, electrical filtering, decision threshold adjustment, and optical gain adjustment. Each of these compensation techniques counteracts or ameliorates one or more of the phenomena to increase the SNR, decreasing the BER.

Higher transmitted bit rates may require additional compensation as compared to lower bit rate systems. For example, at 2.5 Gigabits/second (Gbs), optical signals are relatively unaffected by chromatic dispersion for distances of up to several hundred kilometers. However at 10 Gbs (i.e., four times the data rate), chromatic dispersion is 16 times as severe, requiring dispersion management via dispersion compensating fibre, low dispersion fibre, active dispersion compensation or other methods.

Similarly, increasing the data rate to 40 Gbs increases the chromatic dispersion effects by an additional factor of 16 so that dispersion compensation has to be accurate within tens of picoseconds per nanometer.

Some of the compensation techniques require tuning or adjustment to operate. Compensation techniques that have been applied to lower bit-rate systems have required only static tuning. For these systems, tuning is performed once during installation by skilled personnel and may not need to be repeated thereafter.

As described above, higher data rates place an additional burden on the existing compensation techniques and, in some cases, require additional techniques to ameliorate phenomena that were previously inconsequential. Some of the phenomena that are being compensated for are inherently time varying in nature. Previous, static, tuning strategies are often no longer sufficient; dynamic self-tuning strategies are required.

Even at higher data rates, some of the compensation techniques can continue to use static tuning strategies if the associated phenomenon has the appropriate characteristics. However, economic considerations make a self-tuning system desirable as it avoids the need for skilled personnel to perform the tuning process.

Some mechanisms are already known in the art to provide self-tuning. U.S. Pat. No. 6,081,360, herein included by reference, discloses a system in which dispersion compensation is automatically adjusted by monitoring the power level of a particular frequency component of an optical signal sent from the transmitter to the receiver. However, the power level of an optical signal is at best an indirect indicator of the proper setting for a dispersion compensator.

A goal of the invention is to provide a self-tuning optical communications system using direct tuning indications.

SUMMARY OF INVENTION

The bit error rate of received data, prior to forward error correction, is measured. This measurement is used in a closed-loop feedback control system that tunes an optical communication system. In a first initialization phase, for example at system switch on, compensator elements in the system are set either to default values, or swept across their tuning range, while the bit error rate of received data is monitored. In a second 'in-service' phase, compensator elements in the system are tuned dynamically to optimize system performance.

In a preferred embodiment, one or more control signals modulate compensators. The raw bit error rate is measured and correlated with the control signals to determine the optimum nominal setting for each compensator.

DETAILED DESCRIPTION OF THE PREFERRED EMBODIMENT

A method and system for providing automatic set-up and dynamic optimization of an optical link, including optical and electronic components in the optical transmitter, receiver or in the optical transmission path. The objective is to provide automatic optimization of optical system performance at switch-on and during operational life, based on a direct measure of system bit error rate, while maintaining a very low output error rate.

In the following descriptions, numerous specific details are set forth, such as the specific rendering of the implementation, in order to provide a thorough understanding of the present invention. It will be apparent, however, to one skilled in the art that the present invention may be practiced without these specific details. In other instances, well-known circuits, control logic and coding techniques have not been shown in detail, in order to avoid unnecessarily obscuring the description of the present invention.

Figure 1:
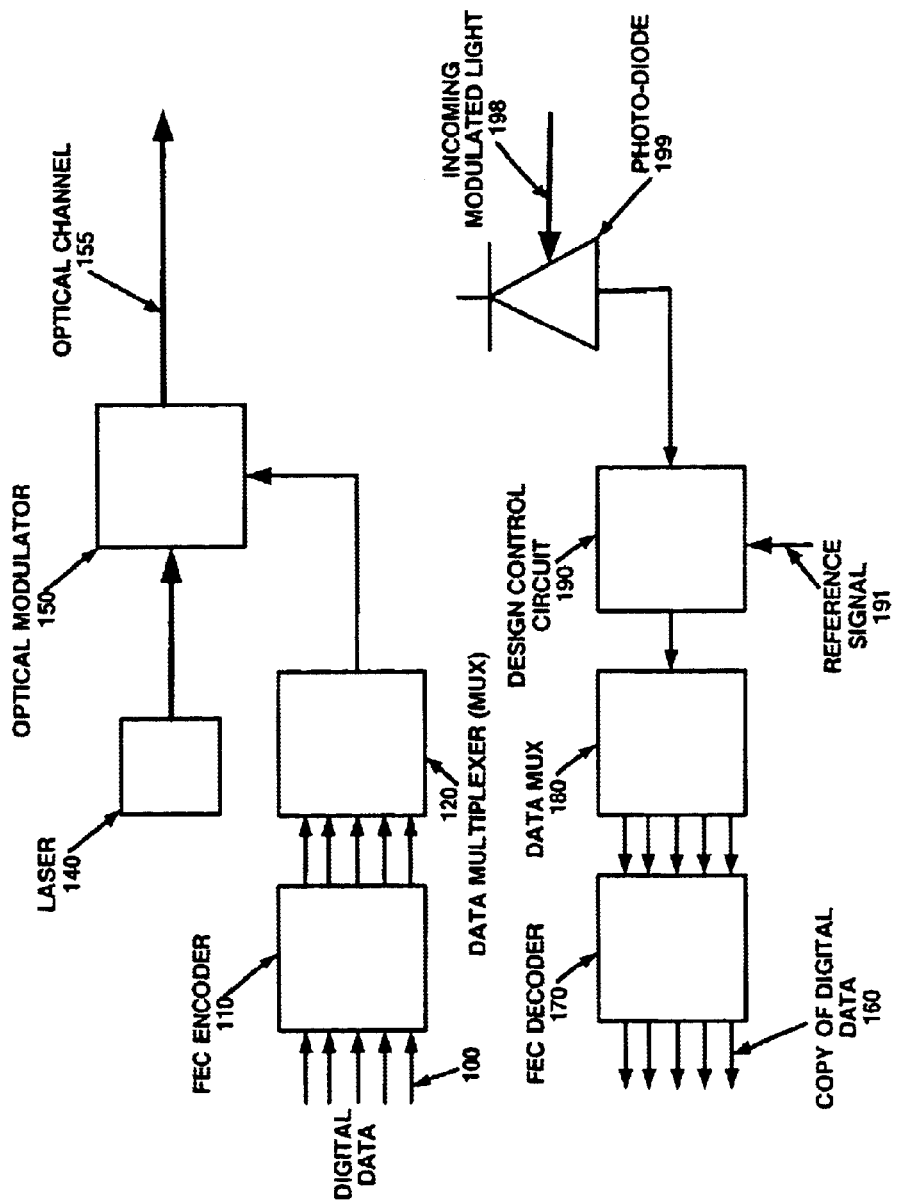
FIG. 1 shows a schematic of an optical transmitter and receiver.

FIG. 1 shows the transmitter and receiver of an optical data transmission system. The transmitter receives digital data for transmission and converts this into modulated light as follows. FEC encoder 110 receives digital data 100, computing the FEC check bits. Data multiplexer 120 receives the output of FEC encoder 110, converting it into a serial data stream. Optical modulator 150 receives the serial data stream from data multiplexer 120, modulating light output from laser 140 for transmission via optical channel 155.

The receiver processes incoming modulated light, extracting the transmitted data as follows. Incoming modulated light 198 is detected by photodiode 199, generating an electrical signal according to the incident light. Decision control circuit 190 converts the incoming electrical signal into a serial bit stream. Data multiplexer 180 converts the serial bit stream into blocks of received data. FEC decoder 170 processes each block of received data producing a copy of digital data 160.

Decision control circuit 190 operates by comparing the incoming electrical signal to a reference 191, yielding one bit of the received data. Well known techniques allow the generation of a clocking signal to time the data recovery operation.

Figure 2:
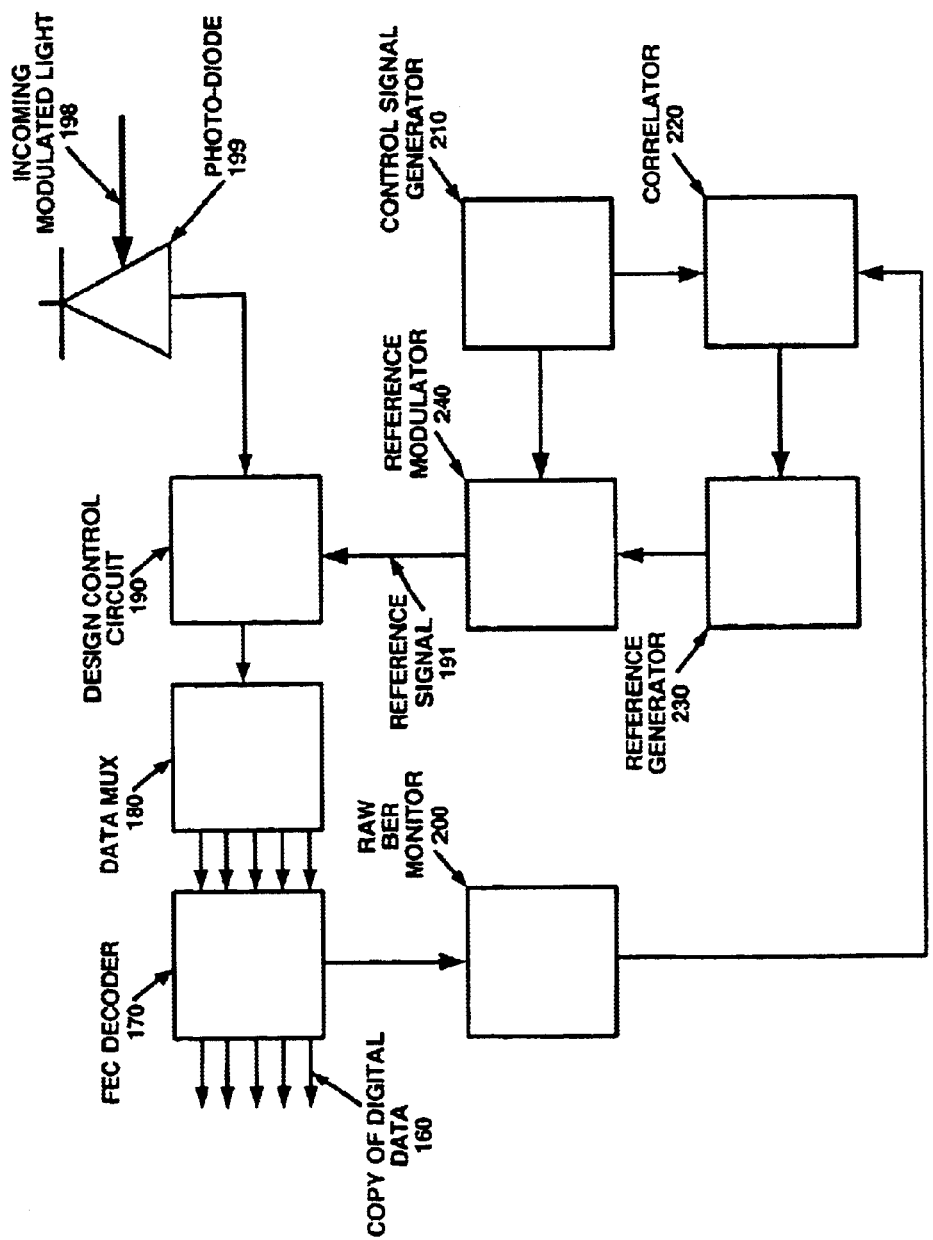
FIG. 2 shows an optical data receiver decision circuit controlled by raw bit error rate detection circuitry.

FIG. 2 shows a system for self-tuning of the reference. Control signal generator 210 generates a control signal. Raw BER monitor 200 provides an indication of the rate of bit corrections over a time horizon. Correlator 220 correlates the output of control signal generator 210 and raw BER monitor 200 to generate a reference adjustment. Reference generator 230 generates the nominal reference for decision circuit 190 as tuned by the output of correlator 220. Reference modulator 240 modulates the output of reference generator 230 with the control signal from control signal generator 210. Correlator 220 correlates the amplitude and phase of the control signal to changes in the measured raw bit error rate, adjusting the reference to minimize the error rate.

Correlator 220 and raw BER monitor 200 provide closed-loop control of the system. Well known control techniques could be used including: proportional, integrative, root mean square, root sum of squares, and others. Care must be taken in the design of the control system that its response time horizon is compatible with the rate of change of the phenomenon for which it is compensating. Another constraint is that the response time horizon must be compatible with the raw BER.

Control signal generator 210 generates a control signal that modulates the reference voltage for decision circuit 190. In the preferred embodiment, the generated signal is a sine wave with a frequency compatible with the response time horizon of the control system. The amplitude of the control signal modulation is carefully selected. The minimum amplitude of the control signal must induce meaningful variation in the raw BER, since this is the source of the feedback control. The maximum amplitude of the control signal should not increase the raw BER beyond the ability of the FEC algorithm to maintain the desired system BER. Other waveforms for the generated signal would be equally applicable including: square wave, control code, pseudo-random and others.

Figure 3:
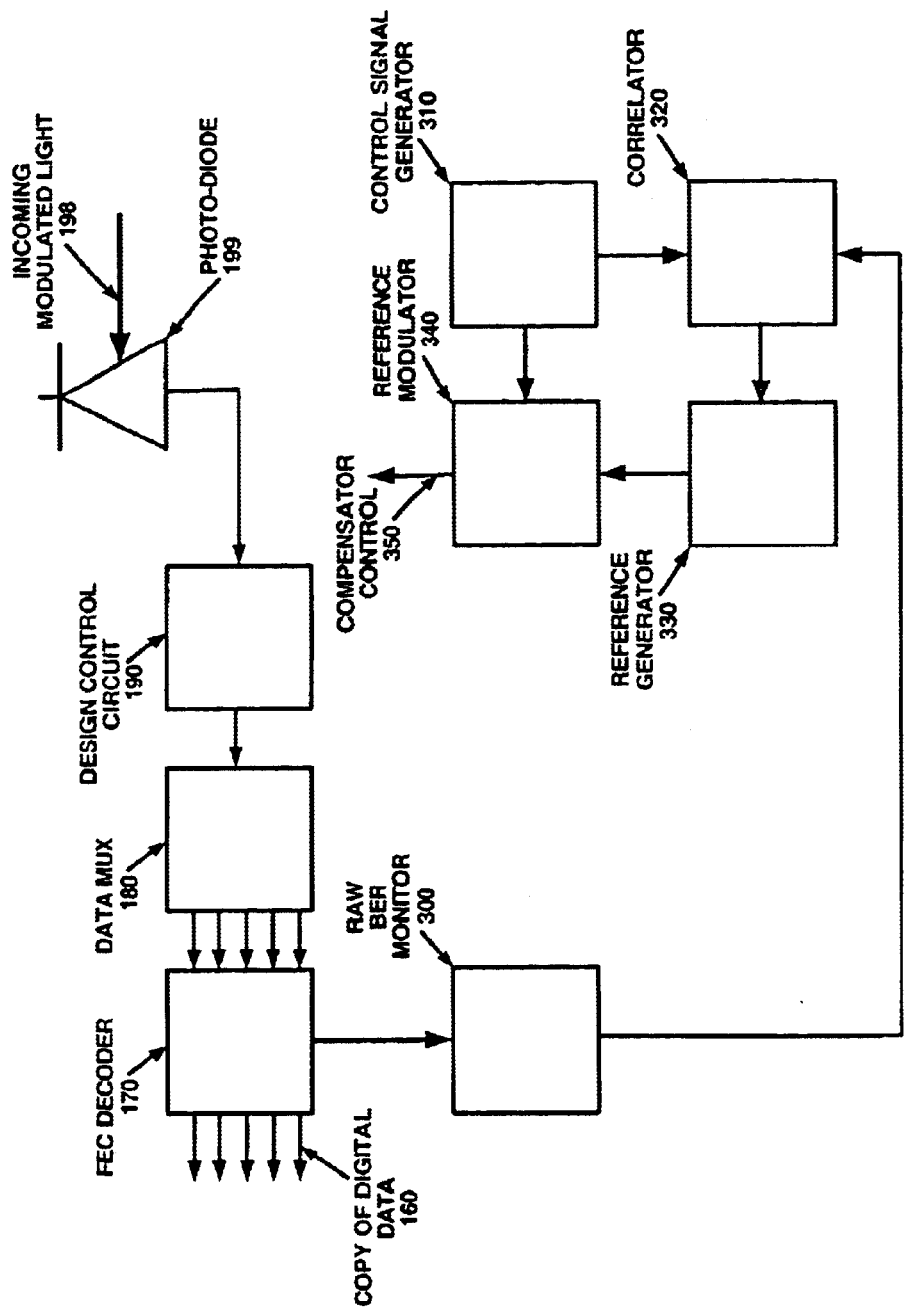
FIG. 3 shows an optical data receiver augmented by a raw bit error rate controlled compensation adjustment circuit.

The invention in FIG. 2 can be extended to other compensation techniques including: chromatic dispersion compensation, polarization mode dispersion compensation, optical filter center wavelength positioning, electronic filtering, optical amplification and gain control, and other. FIG. 3 shows such a system. Control signal generator 310 generates a control signal. Raw BER monitor 300 provides an indication of the rate of bit corrections over a time horizon. Correlator 320 correlates the output of control signal generator 310 and raw BER monitor 300 to generate an adjustment indication. Reference generator 330 generates the nominal reference for the uncontrolled compensator as tuned by the output of correlator 320. Reference modulator 340 modulates the output of reference generator 330 with the control signal from control signal generator 310, generating compensator control 350. Correlator 320 correlates the amplitude and phase of the control signal to changes in the measured raw bit error, adjusting the reference to minimize the error rate. Compensator control 350 controls the amount of compensation provided by the compensator.

The embodiments described above adjust only a single compensator. This was done for simplicity of explanation and is not a limitation of the invention. The invention is capable of simultaneously adjusting a plurality of compensators. One embodiment is to replicate control signal generator 310, correlator 320, reference generator 330, and reference modulator 340 for each compensator. Each correlator 320 correlates the output of raw BER monitor 300 with its corresponding control signal generator 310 to perform the optimization process. The requirement that each correlator 320 be able to distinguish BER changes due to reference modulation associated with the corresponding control signal generator 310 is simplified by having the outputs of the plurality of control signal generators 310 uncorrelated. Further, as understood herein, an electronic equalizer is equivalent to an electronic filter. Additionally, it is contemplated herein that error correction is an optional function to accomplish the present invention.

In the foregoing specification, the invention has been described in its normal 'in service' mode. For some systems, the normal 'in service' mode may be used right from initial switch-on of the system. For other systems where the system effects to be compensated for are especially severe, there may be no measurable raw error rate available. In this latter case, there will need to be a system initialization mode, that sets the various compensators at nominal set-point values, and/or which steps or sweeps a set of compensators through their control range while measuring and recording raw error rate, and then sets the compensator at a point in its control range corresponding to best system operation. Alternatively the post FEC processor error rate could be monitored during the initialization mode. Alternatively, a secondary characteristics of the received signal could be monitored during the initialization mode, such as the high frequency content of the received data. Alternatively the initialization mode can use a known transmitted data waveform (for example a predetermined sequence of '1's and '0's) containing both low and high frequency data modulation frequencies to provide a more gradual deterioration of raw error rate with link compensation error than there would be with random data. Alternatively, during the initialization mode the transmitter bit rate may be stepped from a lower rate up to the full bit rate, so that the systems raw error rate becomes increasingly critical to compensate setting as the bit rate is increased.

The purpose of the initialisation mode is to bring all the compensators to near optimum values, at which point the 'in service' mode can be engaged, to fine tune the compensators to fully optimum settings.

Some nominal set points might be setting decision threshold to nominal 50% of the received eye, for example by A.C. coupling the received signal into the decision circuit, and then switch to raw BER to fine tune, or setting internal clock to incoming transmitter rate and just performing a phase sweep. For electronic PMD compensation using a tapped-delay-line implementation (transversal filter), nominal set points might include setting the center tap to one, and the outer taps to zero, with those tap weightings to be more finely tuned using error information. For an optical PMD compensator, the nominal set-point might be to align the incoming states of polarization with the principle axes. The nominal chromatic dispersion compensator setting would depend on fiber link length. The chromatic compensator could be stepped through a reasonable range to determine the appropriate setting, where the step increment (in ps/nm) would be approximately proportional to the inverse square of the bit rate, so that at least one of its set points will fall within the dispersion tolerance window of the system.

In a preferred embodiment the initialization routine and the set points and sweeps for the compensators would be stored in a non-volatile memory. Alternatively the initialization routine and set points and sweeps can be transmitted to the optical transmitter and receiver by an external link management system.

Additionally, it is contemplated herein that an alternative approach for implementing one or more aspects of the present invention includes effectively operation without error correction, or optionally in an open-loop non-feedback mode. For example, after initialization adjustment step, operation may continue, whereupon adjustment is invoked only upon user or automated trigger or scheduled events or conditions, such as start-up or when pre-specified error rate is determined to drop below an acceptable threshold.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for reducing error rates in received data, said system comprising:
   a receiver for receiving a bit stream;
   an error monitor coupled to said receiver and for indicating a first error rate for a first set of data received in said bit stream;
   an adjustable circuit coupled to said error monitor and for converting an incoming signal into said bit stream using a reference signal that is modulated using a control signal; and
   a subsystem coupled to said circuit and for correlating said first error rate and said control signal to generate said reference signal, said control signal having an amplitude that is selected so that said converting results in a second set of data received in said bit stream having a second error rate that is less than said first error rate.

2. The system of claim 1 wherein said circuit controls a decision threshold.

3. The system of claim 1 wherein said circuit controls the gain of an optical amplifier.

4. The system of claim 1 wherein said circuit controls chromatic dispersion compensation.

5. The system of claim 1 wherein said circuit controls polarization mode dispersion compensation.

6. The system of claim 1 wherein said circuit controls the gain of an optical attenuator.

7. The system of claim 1 wherein said circuit controls an optical or electronic filter.

8. A system for reducing error rates in received data, said system comprising:
   a decision control circuit for converting an incoming electrical signal into a bit stream comprising a first set of received data;
   an error monitor coupled to said decision control circuit and for indicating a first error rate in said first set of received data;
   a control signal generator coupled to said error monitor and for generating a control signal, wherein said control signal is a waveform having an amplitude selected to produce a second error rate in a second set of received data, said second error rate less than said first error rate;
   a correlator coupled to said error monitor and for correlating said first error rate with said control signal to generate a reference adjustment;
   a reference generator coupled to said correlator and for generating a reference signal that is adjusted using said references adjustment to produce an adjusted reference signal; and
   a modulator coupled to said reference generator and for modulating said adjusted reference signal by said control signal to generate a modulated reference signal, wherein said modulated reference signal is used by said decision control circuit to convert said electrical signal into said bit stream.

9. The system of claim 8 wherein said decision control circuit controls a decision threshold.

10. The system of claim 8 wherein said decision control circuit the gain of an optical amplifier.

11. The system of claim 8 wherein said decision control circuit chromatic dispersion compensation.

12. The system of claim 8 wherein said decision control circuit polarization mode dispersion compensation.

13. The system of claim 8 wherein said decision control circuit the gain of an optical attenuator.

14. The system of claim 8 wherein said decision control circuit an optical filter.

15. A method of reducing error rates in received data, said method comprising:

receiving an electrical signal from a transmission channel;

converting said electrical signal into a bit stream comprising a first set of data;

indicating a first error rate in said first set of data;

generating a control signal, wherein said control signal is a waveform having an amplitude selected to produce a second error rate in a second set of data received in said bit stream, said second error rate less than said first error rate;

correlating said first error rate with said control signal to generate a reference adjustment;

generating a reference signal that is adjusted using said reference adjustment to produce an adjusted reference signal; and modulating said adjusted reference signal with said control signal to produce a modulated reference signal, wherein said modulated reference signal is used convert said electrical signal into said bit stream.

16. The method of claim 15 wherein said converting step is performed using a decision threshold.

17. The method of claim 15 wherein said converting step is performed by altering the gain of an optical amplifier.

18. The method of claim 15 wherein said converting step is performed by a chromatic dispersion compensator.

19. The method of claim 15 wherein said converting step is performed by a polarization mode dispersion compensator.

20. The method of claim 15 wherein said converting step is performed by altering the gain of an optical attenuator.

21. The method of claim 15 wherein said converting step is performed by an optical filter.

22. A system for reducing error rates in received data, said system comprising:

a decision control circuit for converting an incoming electrical signal into a bit stream comprising a first set of received data;

an error monitor coupled to said decision control circuit and for indicating a first error rate in said first set of received data;

a plurality of control signal generators coupled to said error monitor and for generating a plurality of control signals, wherein said control signals are waveforms having amplitudes selected to produce second error rates in said sets of received data, said second error rates less than said first error rate;

a plurality of correlators coupled to said error monitor and for correlating said first error rate with said control signals to generate a plurality of reference adjustments;

a plurality of reference generators, each reference generator coupled to a respective correlator and for generating a respective reference signal that is adjusted using a respective reference adjustment to produce a plurality of respective adjusted reference signals; and a plurality of modulators, each modulator coupled to a respective reference generator and for modulating a respective adjusted reference signal by a respective control signal to generate a plurality of respective modulated reference signals, wherein said modulated reference signals are used by said decision control circuit to convert said electrical signal into said bit stream.

23. The system of claim 22 wherein said decision control circuit utilizes a decision threshold.

24. The system of claim 22 wherein said decision control circuit utilizes an optical amplifier.

25. The system of claim 22 wherein said decision control circuit compensates for chromatic dispersion.

26. The system of claim 22 wherein said decision control circuit compensates for polarization mode dispersion.

27. The system of claim 22 wherein said decision control circuit utilizes an optical attenuator.

28. The system of claim 22 wherein said decision control circuit utilizes an optical filter.

29. A method of reducing error rates in received data, said method comprising:

receiving an electrical signal from a transmission channel;

converting said electrical signal into a bit stream comprising a first set of data;

indicating a first error rate in said first set of data;

generating a plurality of control signals, wherein said control signals are waveforms having amplitudes selected to produce second error rates in second sets of data, said second error rates less than said first error rate;

correlating said first error rate with said control signals to generate a plurality of reference adjustments;

generating a plurality of reference signals, wherein each of said reference signals is adjusting using a respective reference adjustment to produce a plurality of respective adjusted reference signals; and modulating each adjusted reference signal by a respective control signal to produce a plurality of respective modulated reference signals, wherein said modulated reference signals are used convert said electrical signal into said bit stream.

30. The method of claim 29 wherein said converting is performed using a decision threshold.

31. The method of claim 29 wherein said converting is performed by an optical amplifier.

32. The method of claim 29 wherein said converting comprises chromatic dispersion compensation.

33. The method of claim 29 wherein said converting comprises polarization mode dispersion compensation.

34. The method of claim 29 wherein said converting is performed by an optical attenuator.

35. The method of claim 29 wherein said converting is performed by an optical filter.

* * * * *